United States Patent [19]
Oda

[11] Patent Number: 5,799,544
[45] Date of Patent: Sep. 1, 1998

[54] APPARATUS FOR SEALING A BICYCLE CONTROL CABLE

[75] Inventor: Hiromi Oda, Sakai, Japan

[73] Assignee: Shimano Inc., Osaka, Japan

[21] Appl. No.: 837,288

[22] Filed: Apr. 11, 1997

Related U.S. Application Data

[62] Division of Ser. No. 559,908, Nov. 17, 1995.

[30] Foreign Application Priority Data

Nov. 18, 1994 [JP] Japan .................. 6-309496
Jan. 24, 1995 [JP] Japan .................. 7-2704

[51] Int. Cl.$^6$ .................. F16C 1/26; F16C 1/10
[52] U.S. Cl. .................. 74/502.4; 74/502.6
[58] Field of Search .................. 74/502.5, 502.4, 74/502.6, 500.5, 501.5 R; 280/281.1

[56] References Cited

U.S. PATENT DOCUMENTS

| | | | |
|---|---|---|---|
| 3,938,405 | 2/1976 | Sommerer | 74/501 R |
| 3,957,138 | 5/1976 | Kine | 188/196 F |
| 4,066,147 | 1/1978 | Toyomoto | 184/15 R |
| 4,131,379 | 12/1978 | Gordy | 403/197 |
| 4,304,149 | 12/1981 | Heimann | 74/501 R |
| 4,572,696 | 2/1986 | Morikawa | 403/265 |
| 4,585,246 | 4/1986 | Diekman et al. | 280/281.1 |
| 4,726,251 | 2/1988 | Niskanen | 74/502 |
| 4,768,798 | 9/1988 | Reed et al. | 280/281.1 |
| 4,833,937 | 5/1989 | Nagano | 74/501.5 |
| 4,887,482 | 12/1989 | Romano | 74/502.6 |
| 4,892,005 | 1/1990 | Nagano | 74/502.4 |
| 4,895,041 | 1/1990 | Cunningham | 74/502.4 |
| 4,917,397 | 4/1990 | Chonan | 280/281.1 |
| 5,119,686 | 6/1992 | Adams | 74/502.5 |
| 5,353,626 | 10/1994 | Davidson | 74/502.6 |
| 5,363,719 | 11/1994 | Johnson et al. | 74/502.4 |
| 5,433,465 | 7/1995 | Klien et al. | 74/502.4 X |

FOREIGN PATENT DOCUMENTS

| | | |
|---|---|---|
| 2154229 | 5/1973 | France . |
| 2398914 | 7/1979 | France . |
| 2532381 | 3/1984 | France . |
| 2578600 | 9/1986 | France . |
| 2614659 | 11/1988 | France . |
| 1099834 | 1/1968 | United Kingdom . |
| 1409524 | 10/1975 | United Kingdom . |
| 2071254 | 9/1981 | United Kingdom . |
| 2241999 | 9/1991 | United Kingdom . |

OTHER PUBLICATIONS

European Search Report for EP 95 30 8285, dated Feb. 20, 1996.
Ridge-Runner Magazine. Nov. 1990.
English translation of "2 Special Frame Work" from p. 4, Ridge-Runner Magazine, Nov. 1990.

*Primary Examiner*—Charles A. Marmor
*Assistant Examiner*—Saúl J. Rodriguez
*Attorney, Agent, or Firm*—James A. Deland

[57] ABSTRACT

A cap is provided for fitting over a bicycle control cable. The cap includes first and second portions. The first portion has a first inner surface defining a first inner hole, the first inner hole having a diameter greater than an outside diameter of the inner cable and smaller than an inside diameter of the casing. The second portion has a second inner surface defining a second inner hole, the second inner hole having a diameter capable of receiving an end of the casing. The first inner hole is sized to help prevent the penetration of foreign objects into the control cable.

1 Claim, 9 Drawing Sheets

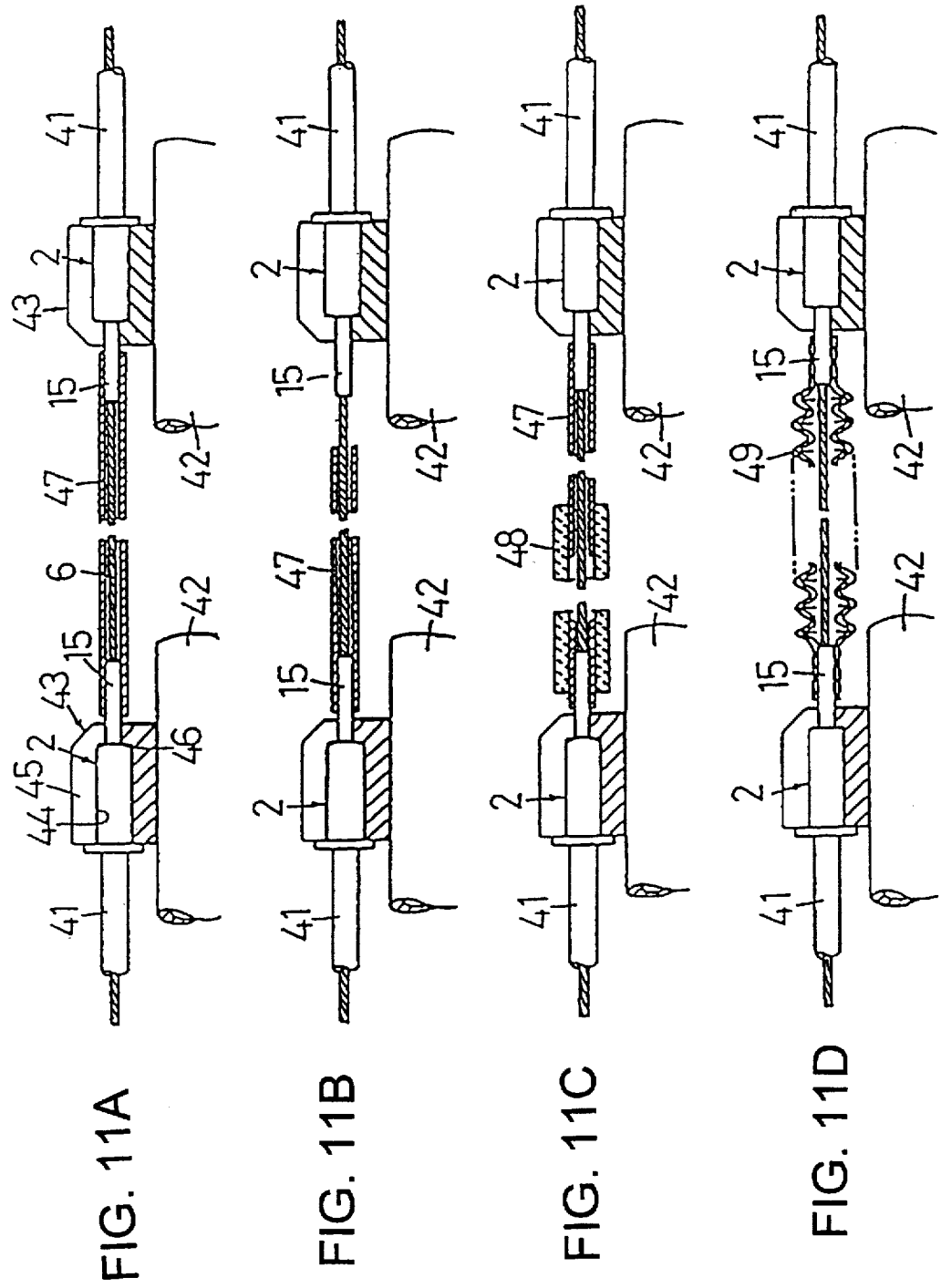

APPARATUS FOR SEALING A BICYCLE CONTROL CABLE

This is a division of application Ser. No. 08/559,908 filed Nov. 17, 1995.

BACKGROUND OF THE INVENTION

The present invention is directed to bicycle control cables and, more particularly, to devices for sealing such control cables from deterioration as a result of the penetration of foreign objects such as muddy water.

Control cables for controlling brakes and shift levers in a bicycle generally comprise an inner cable slidingly disposed within an outer casing. Inner cables are made by twisting several steel wires together. Outer casings commonly consist of a synthetic resin liner that slides on the outer circumferential surface of the inner cable, a band steel sheet spirally wound around the liner, and a synthetic resin jacket covering the circumference of the band steel sheet. A gap to facilitate inner cable slip is provided between the circumferential surface of the inner cable and the inside diameter of the liner. Unfortunately, foreign objects and muddy water may penetrate from the end of the cable into the gap and increase the sliding resistance between the inner cable and housing, resulting in poor operating performance. Also, foreign objects such as clay and sand in the muddy water also act as grinding materials and promote wear in the liner and inner cable. Thus, such contamination should be prevented as much as possible.

SUMMARY OF THE INVENTION

The present invention is directed to an apparatus for sealing a bicycle control cable of the type wherein an inner cable is slidingly disposed within an outer casing so that foreign objects do not penetrate between the cable housing and the cable. The apparatus is simple, lightweight, and can be added to existing control cables.

In one embodiment of the present invention, a cap is provided for fitting over the control cable. The cap includes first and second portions. The first portion has a first inner surface defining a first inner hole, the first inner hole having a diameter greater than an outside diameter of the inner cable and smaller than an inside diameter of the casing. The second portion has a second inner surface defining a second inner hole, the second inner hole having a diameter capable of receiving an end of the casing. The first inner hole is sized to help prevent the penetration of foreign objects into the control cable.

Many embodiments of such a cable are possible. For example, the first portion may comprise essentially an end face of the cap, or it may comprise an elongated portion of the cap. The thickness of the cap may be adjusted to allow the cap to bend with the cable. The cap may include a reservoir space disposed between the first inner hole and the second inner hole for allowing the accumulation of contaminants without entering the remaining portions of the cable, or a seal space may be formed the same general location to accommodate a seal. Other portions of the cap may be sealed as well. The inner hole may include a liner to help reduce friction between the cable and the cap, or else a liner already disposed within the control cable housing may include a liner extension passing through the first inner hole. The cap may be used as an adjustment component for the cable by providing a threaded portion which threads into a shift control device or some other component. The caps may be fastened to an existing bicycle control cable system having an exposed portion of the inner cable between first and second segments of the casing. In this case a cap is fastened to each segment of the casing, and a cable cover is sealingly connected to the first cap. The cable cover may cover the entire portion of the inner cable, or only a portion depending upon the application.

BRIEF DESCRIPTION OF THE DRAWINGS

FIGS. 11 (A–D) are enlarged cross sectional views illustrating various methods of using the apparatus according to the present invention.

DETAILED DESCRIPTION OF THE EMBODIMENTS

Figure 1:
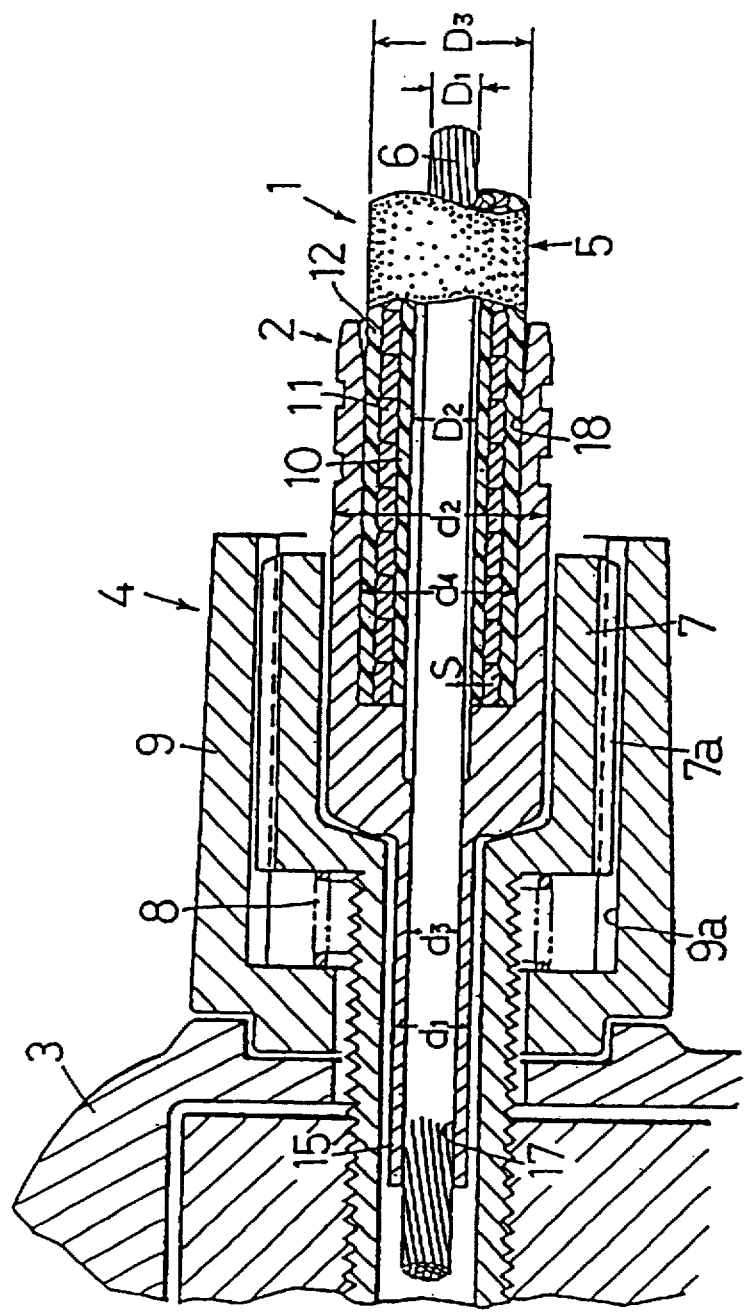
FIG. 1 is a cross sectional view of a particular embodiment of cap according to the present invention for sealing a bicycle control cable.
Figure 2:
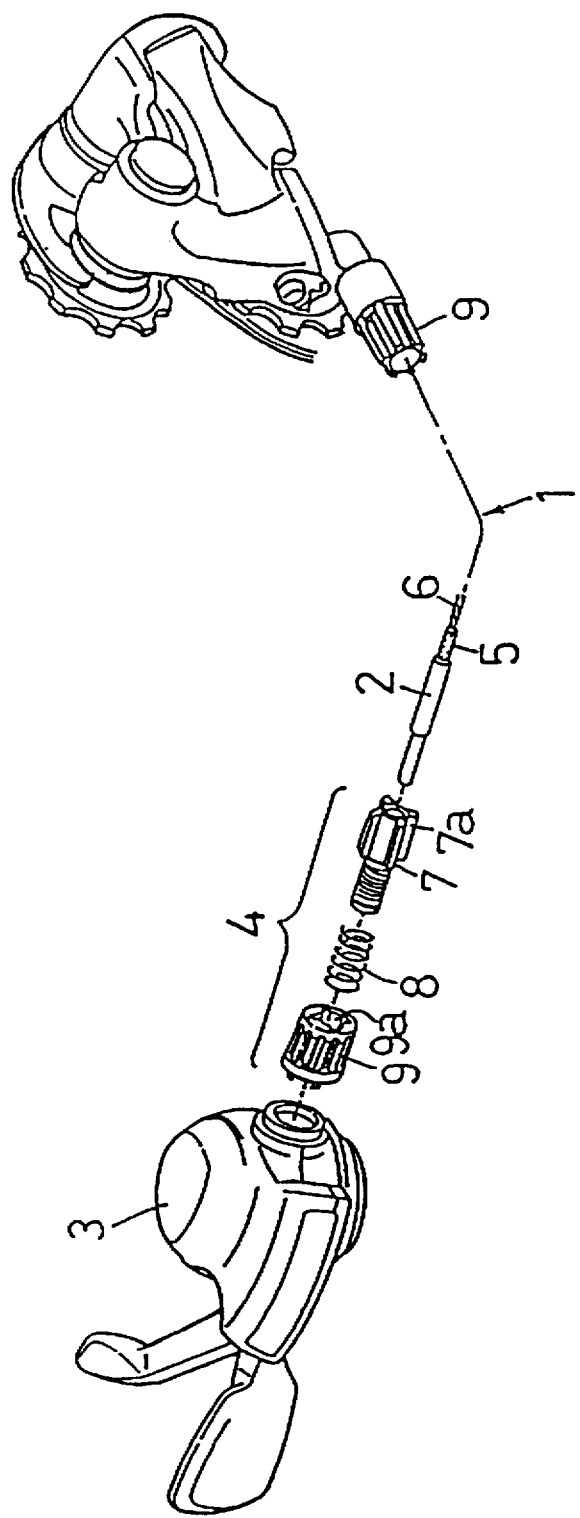
FIG. 2 is an exploded view of a particular embodiment of a cable adjusting barrel unit of a shifting device.

FIG. 1 is a cross sectional view of a particular embodiment of an outer end cap according to the present invention as attached to a bicycle cable. FIG. 2 is an exploded view showing an outer end cap according to the present invention attached to the cable adjusting barrel unit of a shifting device, with a cable installed therein. As shown in those figures, the outer end cap 2 accommodates the end of the bicycle cable 1. The outer end cap 2 is inserted into the cable adjusting barrel unit 4 of the shift operating device 3, and an inner cable 6 is slidably inserted into the outer casing 5 of the cable 1.

The adjusting bolt 7 of the cable adjusting barrel unit 4 is screwed into and secured in a shift operating device 3. A spline 7a is formed around the head of the adjusting bolt 7. This spline 7a is inserted into and engaged in a spline 9a formed in the inner hole in a cylindrical operating clamp 9. When the circumference of the operating clamp 9 is rotated, the adjusting bolt 7 is rotated and driven via the spline 9a and spline 7a. The adjusting bolt 7 is moved axially by this rotation, and relative movement is produced between the inner cable 6 and the outer casing 5 to adjust the position. A coil spring 8 inserted between the adjusting bolt 7 and the operating clamp 9, and this coil spring 8 presses the operating clamp 9 to the shift operating device 3.

The inner cable 6 is made of several steel wires twisted together. A synthetic resin liner 10 for slidably guiding the inner cable 6 is mounted along the circumferential surface of the inner hole of the outer casing 5 around the inner cable 6. The outside diameter of the inner cable 6 is designated D1, and the inside diameter of the inner hole of the liner 10 is designated D2. This inside diameter D2 is greater than the outside diameter D1, thus producing a gap S between them. A band steel sheet 11 is spirally wrapped around the liner 10. The band steel sheet 11 is intended to enhance the strength of the cable 1 and to maintain flexibility. The outer circumference of the band steel sheet 11 is covered with a synthetic resin jacket 12. As a result, the outer casing 5 is composed of a liner 10, band steel sheet 11, and jacket 12.

Figure 3:
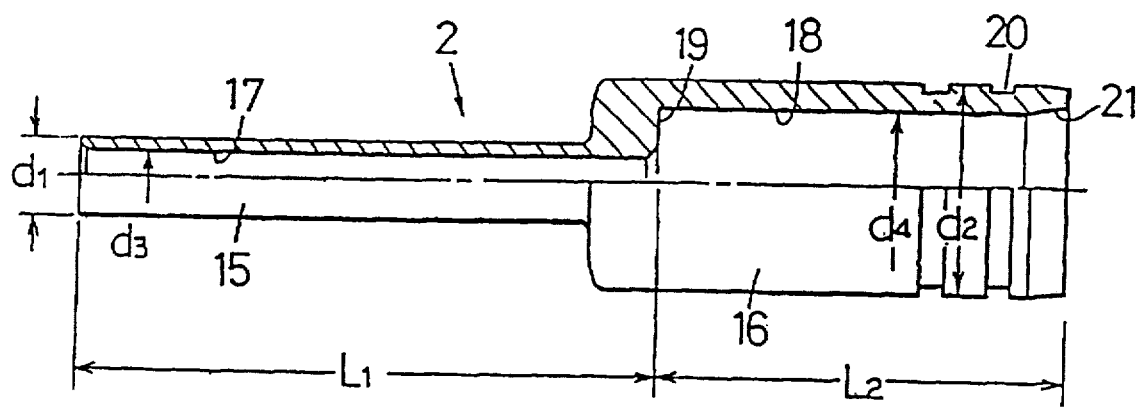
FIG. 3 is an enlarged cross sectional view of the cap shown in FIG. 1.

FIG. 3 is an enlarged cross section of the outer end cap. The outer end cap 2 is made entirely of a synthetic resin, comprising a small diameter component 15 that covers the inner cable 6 component and a large diameter component 16 that covers the outer casing 5. The small diameter component 15 has an outside diameter d1, and the large diameter component 16 has an outside diameter d2. The inside diameter of the small diameter component 15 is d3, and that of the large diameter component 16 is d4. The inside diameter d3 of the small diameter component 15 is greater than the outside diameter D1 of the inner cable 6 and is smaller than the inside diameter D2 of the inner hole of the liner 10, resulting in the following relation: D1<d3<D2.

In this embodiment, there is a gap with a spacing of at least 0.3 mm between the outside diameter D1 of the inner cable 6 and the inside diameter d3 of the small diameter component 15. The gap (that is, (d3–D1)) should be no more than about 3 to 5% of the outside diameter D1 of the inner cable 6. The gap should be such that, when the inner cable 6 is bent, the part characterized by maximum curvature does not block the inner circumferential surface of the inner hole 17 of the small diameter component 15; that is, the inner cable 6 slides smoothly.

The thickness of the small diameter component 15 is thinner than that of the large diameter component 16, so the small diameter component 15 readily bends with the bending of the inner cable 6. The outside diameter d1 of the small diameter component 15 is also no more than ½ of the outside diameter D3 of the cable 1. In this embodiment, the dimensions are no more than 2 mm, because the outer end cap 2 can be made with a lighter weight, and the small diameter component bends more readily with the bending of the inner cable 6, as described above.

The length of the inner hole 17 of the small component 15 is L1, and the length of the inner hole 18 of the large diameter component 16 is L2, where L1>L2. This relation is generally L2=L1×0.8. This is because making the length L1 of the inner hole 17 of the small diameter component 15 as long as possible improves the water repellent effects. There should be sealing effects even in the absence of these conditions, however. An end surface 19 is formed at the tip of the inner hole 18 of the large diameter component 16.

The end surface 19 is intended to protrude at the end surface of the cable 1, forming a right angle with the circumferential surface of the inner hole 18. A 15 degree chamfer component 21 is formed at one end of the inner hole 18. The chamfer component 21 is used to facilitate the insertion of the outer end cap 2 onto the cable 1. A groove 20 is formed on the outermost circumference of the chamfer component 21. The groove 20 is intended to make it difficult for the outer end cap 2 to slip when it is held with the fingers, but the absence of any such groove will not adversely affect the functions of the outer end cap 2.

Figure 4:
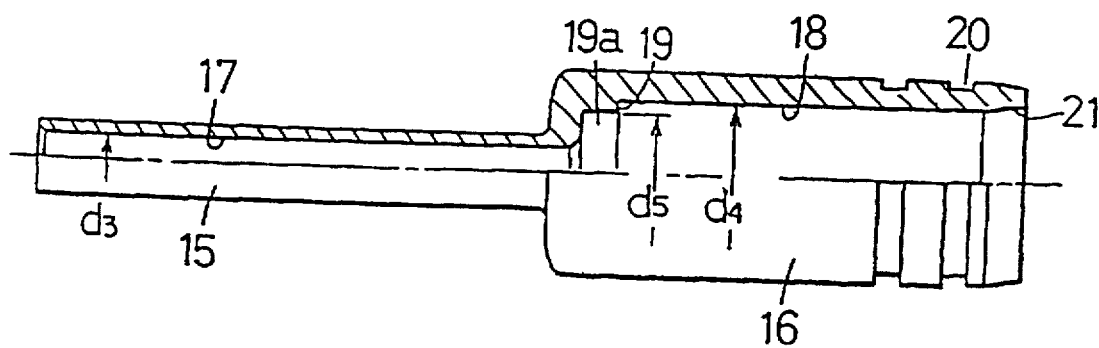
FIG. 4 is an enlarged cross sectional view of a another embodiment of a cap according to the present invention.

FIG. 4 is an enlarged cross section of a second embodiment of the outer end cap 2. The second embodiment has essentially the same structure as that in the first embodiment, but there are some differences. The same symbols are used for parts that are the same as the structural parts in the first embodiment. The description of these parts is omitted.

A foreign object reservoir component 21 is formed between the inner hole 17 of the small diameter component 15 and the inner hole 18 of the large diameter component 16. The foreign object reservoir component 21 is intended to trap foreign objects such as rubber or mud that penetrate from the tip of the small diameter component 15, thus preventing them from penetrating inside the cable 1. The inside diameter d5 of the reservoir component 21 is such that d3<d5<d4.

Figure 5:
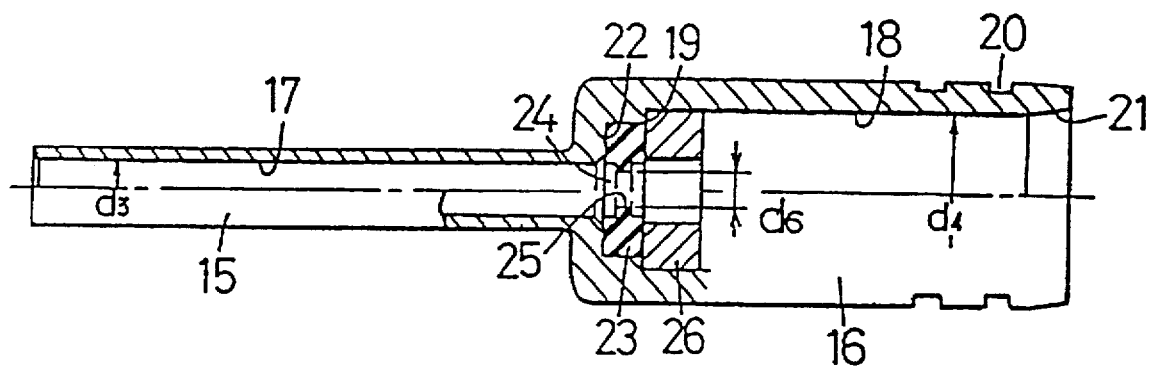
FIG. 5 is an enlarged cross sectional view of another embodiment of a cap according to the present invention.

FIG. 5 is an enlarged cross section of a third embodiment of the outer end cap. The third embodiment has essentially the same structure as that in the first and second embodiments, but there are some differences. The same symbols are used for parts that are the same as the structural parts in the first embodiment. The description of these parts is omitted.

A cylindrical seal space 22 is formed between the inner hole 17 of the small diameter component 15 and the inner hole 18 of the large diameter component 16. A rubber seal 23 is inserted into and secured in this seal space 22. The seal 23 is roughly cylindrical in shape so that it can be inserted into the seal space 22. Cylindrical countersinks 24 are provided at both end faces of the seal 23. An inner cable sliding hole 25 is formed between the countersinks 24.

The inside diameter d6 of the inner cable sliding hole 25 is smaller than the diameter of the outside diameter D1 of the inner cable 6, but the seal 23 is made of rubber and thus deforms, allowing the inner cable 6 to slide, so that muddy water and the like can be prevented from penetrating inside. The seal 23 is secured in the inner hole 18 with a seal cap 26. No seal cap 26 need necessarily be provided. The end face of the outer casing 5 may be allowed to come into direct contact with the seal 23.

Figure 6:
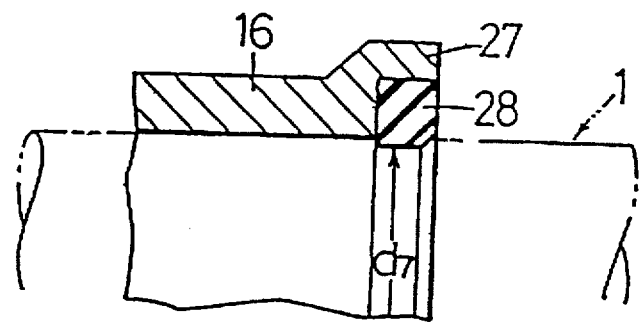
FIG. 6 is an enlarged cross sectional view of a particular embodiment of a seal component according to the present invention for the large diameter component of a cap according to the present invention.

The seal 23 is intended to prevent muddy water from penetrating from the small diameter component 15 and the large diameter component 16, but as shown in FIG. 6, a flange 27 may be formed, a seal 28 may be placed at the flange 27, and muddy water and the like may thus be prevented from penetrating from the large (diameter component. The inside diameter d7 of the seal 28 at this time is smaller than the outside diameter D3 of the cable 1.

Figure 7:
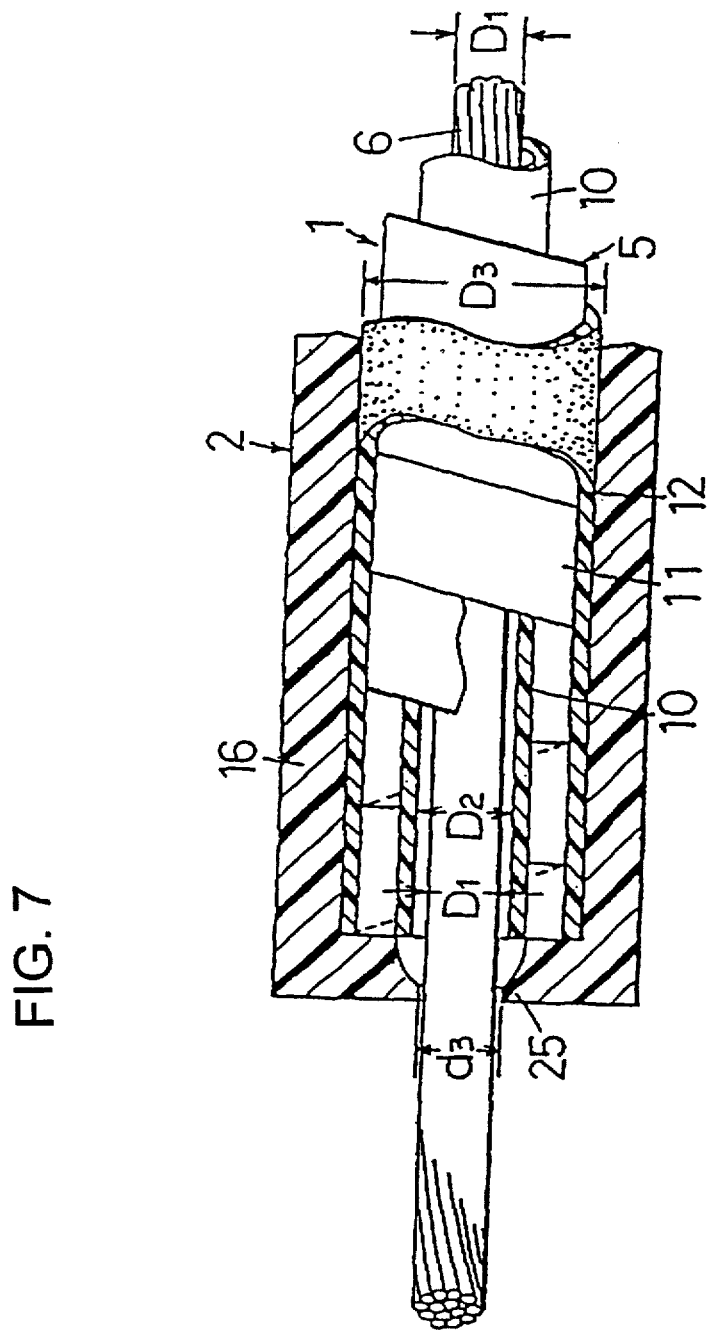
FIG. 7 is an enlarged cross sectional view of another embodiment of a cap according to the present invention.

FIG. 7 is an enlarged cross section of a fourth embodiment of the outer end cap. The structure of the fourth embodiment differs from that of the first through third embodiments.

The first through third embodiments had a small diameter component 15, but this is not provided in the fourth embodiment. In this embodiment, an inside diameter d3 is formed at the end face 25 of the outer end cap 2. The inside diameter d3 is formed based on the same principles as in the first through third embodiments, such that D1<d3<D2. The same symbols are used for parts that are the same as the structural parts in the first embodiment The description of their function and structure is omitted.

Figure 8:
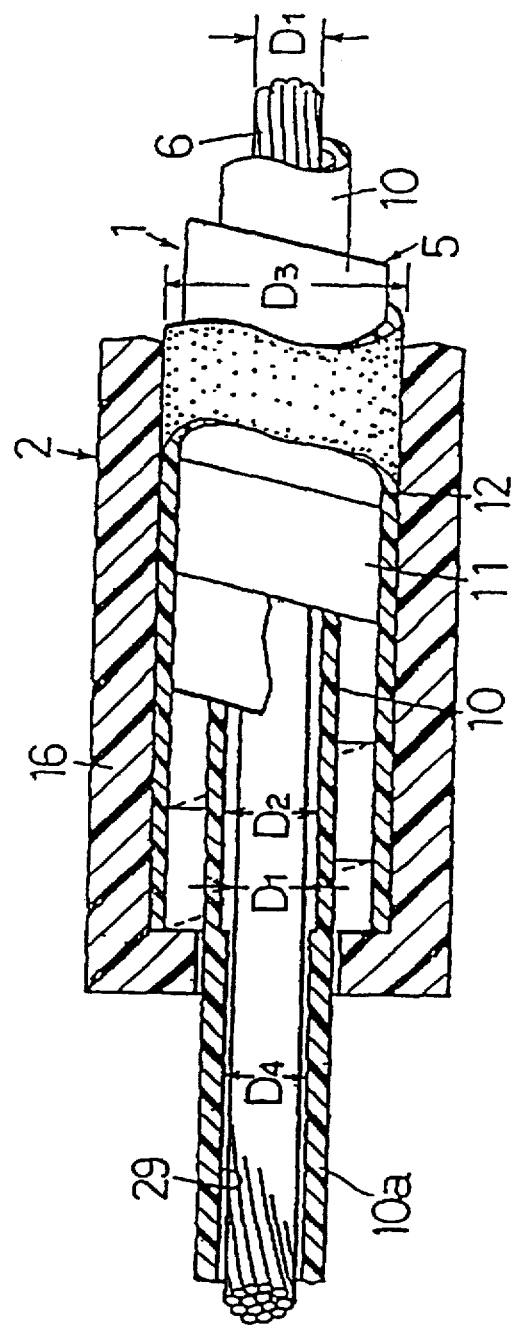
FIG. 8 is an enlarged cross sectional view of another embodiment of an outer end cap according to the present invention.

FIG. 8 is an enlarged cross section of a fifth embodiment of the bicycle cable. In the first through fourth embodiments, the inside diameter D2 of the inner hole of the liner 10 was fixed. The fifth embodiment shown in FIG. 8 has a liner extended part 10a integrated with the liner 10. The inside diameter D4 of the inner hole 29 of the liner extended part 10a is such that inside diameter D2>inside diameter D4, thus making it difficult for foreign objects such as muddy water to penetrate from the liner extended part 10a. The outer end cap 2 in the fifth embodiment may be a conventional type with no small diameter component.

Figure 9:
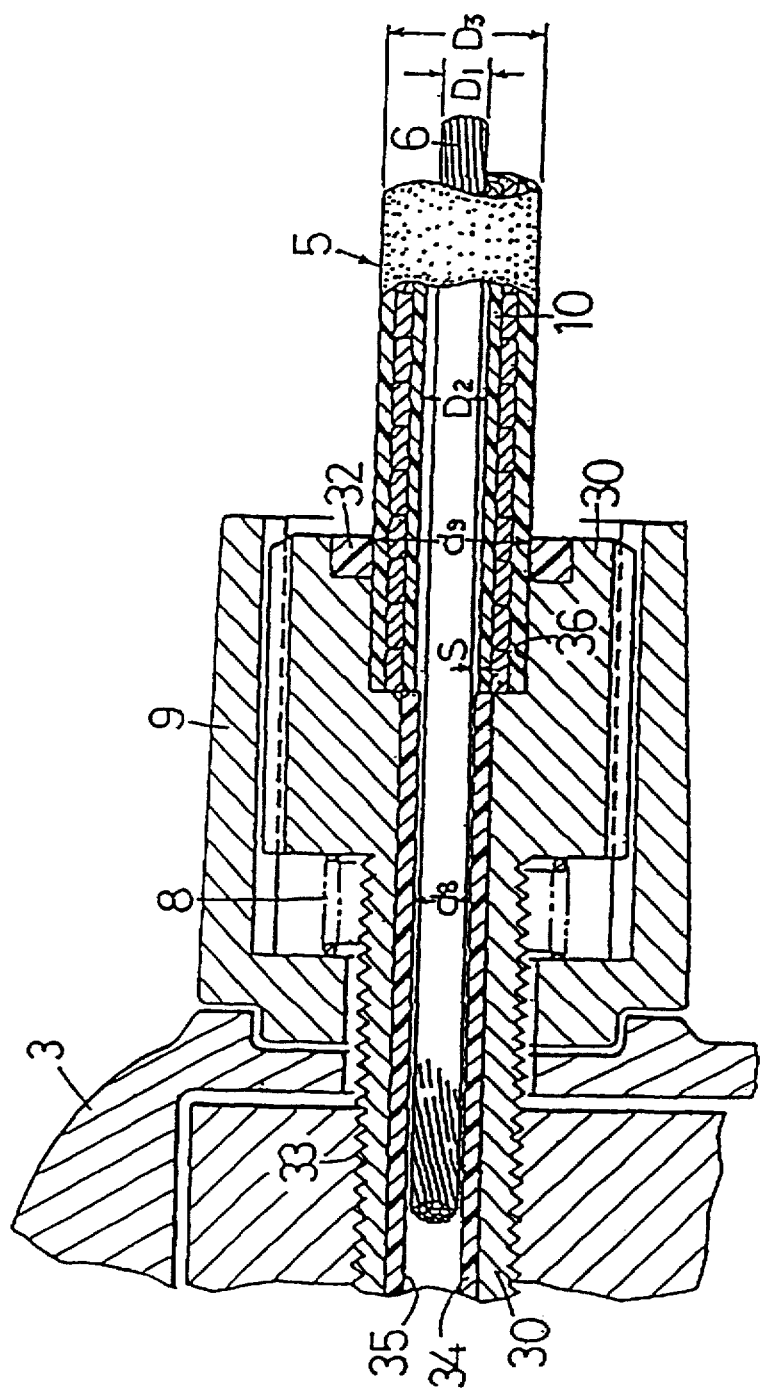
FIG. 9 is an enlarged cross sectional view of another embodiment of an adjusting bolt according to the present invention.

FIG. 9 is an enlarged cross section of a sixth embodiment of an adjusting bolt for a bicycle cable. The sixth embodiment need not be provided with an outer end cap. A liner 34 with good lubricity is integrated with the inside circumferential surface in the inner hole of a screw component 33 of the adjusting bolt 30. The adjusting bolt 30 is made of copper, aluminum, engineering plastic, or the like. A synthetic resin liner 34 with an inner hole 35 is integrally provided by a mechanical fixing method involving coating, injection molding, charging, or the like in the adjusting bolt 30. The synthetic resin of the liner 34 should have good lubricity allowing the wire 6 to slide.

The inner hole 35 of the liner 34 has an inside diameter d8. The adjusting bolt 30 has an inner hole 36 with an inside diameter d9. One end of the outer casing 5 of the cable 1 is inserted into this inner hole 36. The diameter of this inside diameter d9 is the same as or slightly smaller than the outside diameter D3 of the outer casing 5. An annular seal 32 is integrally provided on the head of the adjusting bolt 30. The annular seal 32 is intended to maintain air-tightness between the adjusting bolt 30 and the outer casing 5 of the cable 1, and has a diameter that is the same as or slightly smaller than the outside diameter D3 of the outer casing 5.

The sixth embodiment of an adjusting bolt 30 does not need an outer casing cap and thus has the advantage of fewer parts. The sixth embodiment of an adjusting bolt 30 has a liner 34 and an annular seal 32 but need not necessarily have this liner 34.

Figure 10:
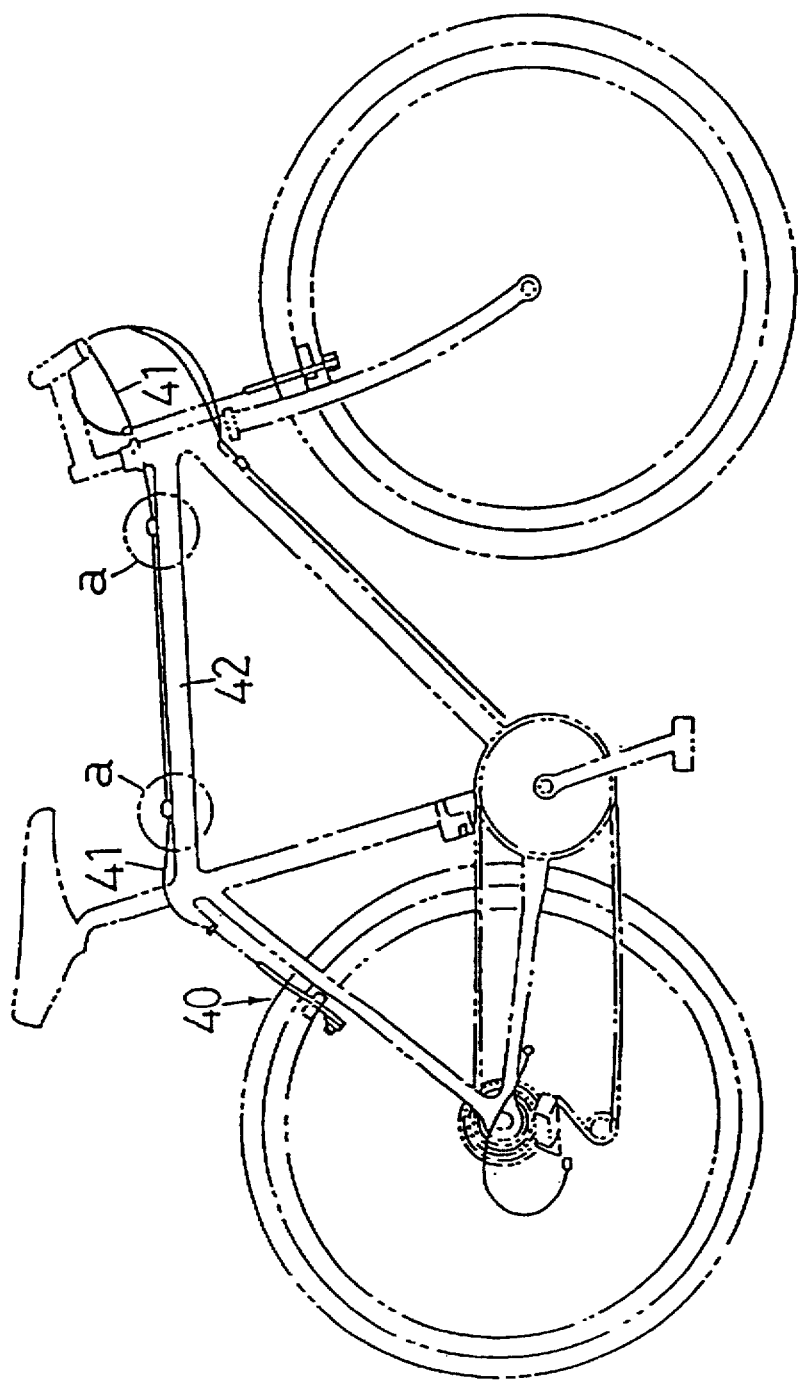
FIG. 10 illustrates an example of a cap according to the present invention used in an intermediate position in a cable.

FIG. 10 illustrates an example in which the outer end cap is used in an intermediate position in a shifter or brake cable. FIG. 11(a) is an enlarged cross section of parts a in FIG. 10. FIGS. 11(b), (c), and (d) are other examples of use. When the overall length of a bicycle cable for operating brakes, shifters, or the like is lengthy, there is an increase in the resistance caused by friction between the exterior circumference of the inner cable 6 and the inside circumferential surface of the liner 10, and substantial force is needed to operate it.

In one method that has been adopted, as shown in FIG. 10, the linear component between points 41 of the cable used to operate the brakes 40, for example, has no outer casing 5, leaving the inner cable 6 exposed. The outer end cap 2 pertaining to the present invention can be used for this intermediate part. A pair of cable receivers 43 and 43 are integrally provided on the side frame 42 of the bicycle. The cable receivers 43 have a cylindrical inner hole 44, with an end face 46 at one end of this inner hole 44.

A slit 45 is formed in the axial direction in the inner hole 44. The slit 45 is to be used when the cable 41 is assemble with the bicycle and is intended to have only the inner cable 6 pass through. The aforementioned outer end cap 2 is inserted into the inner hole 4 of the cable receiver 43, and only the small diameter component 15 is allowed to protrude from the end face 46. An outer end cap 2 is similarly inserted into the other cable receiver 43 opposite, and they are made to face each other.

A cable cover 47 that covers the outer circumference of the inner cable 6 is fitted and fixed around the small diameter components 15 of the outer end caps 2 and 2. The cable cover 47 is a transparent synthetic resin pipe. The cable cover 47 is not necessarily needed but it is intended to protect the inner cable 6 and to prevent foreign objects from penetrating inside the cable 41.

In the case of the example of use illustrated in FIG. 11(a), the cable cover 47 cannot be fitted around the small diameter components 15 and 15 unless it is cut to a precise length. As shown in FIG. 11(b), however, the cover can be used without being able to be fitted around the small diameter components 15 of one of the outer end caps 2 when the cover cable 47 is short.

The example of the use of outer end caps shown in FIG. 11(c) is of an example in which a cable cover 48 with an outside diameter greater than that of the cable cover 47 is fitted around and connected to this cable cover 47. The example of use shown in FIG. 11(d) shows the use of a corrugated cable cover 49. The corrugated shape can be stretched and compressed, thus allowing the length to be easily adjusted.

As described in detail above, when an outer end cap 2 having a small diameter component 15 is used in the present invention, a cable cover 47 for the protection of the inner cable 6 can be readily secured anywhere.

While the above is a description of various embodiments of the present invention, further modifications may be employed without departing from the spirit and scope of the present invention. For example, liners such as 10 and 34 may be omitted, and the caps may assume many different shapes and have more or less components as desired. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. In a bicycle control cable wherein an inner cable (6) is slidingly disposed within an outer casing (5), an apparatus for sealing an exposed section of the inner cable (6) located between a first segment of the outer casing (5) and a second segment of the outer casing (5) comprising:

a first cap including:
  a first portion having a first inner surface defining a first inner hole through which the inner cable (6) passes;
  a second portion having a second inner surface defining a second inner hole, the second inner hole having a diameter capable of receiving an end of the first segment of the casing (5);

a second cap including:
  a first portion having a first inner surface defining a first inner hole through which the inner cable (6) passes;
  a second portion having a second inner surface defining a second inner hole, the second inner hole having a diameter capable of receiving an end of the second segment of the casing (5); and a first cable cover sealingly connected to the first portion of the first cap and extending over the exposed section of the inner cable (6) toward the second cap;

a second cable cover sealingly connected to the first portion of the second cap and extending over the exposed section of the inner cable (6) toward the first cap; and a third cable cover (48) sealingly connected to the first cable cover and to the second cable cover around outer surfaces of the first cable cover and the second cable cover.

* * * * *